United States Patent
Horibe et al.

(10) Patent No.: US 6,765,634 B2
(45) Date of Patent: Jul. 20, 2004

(54) LIQUID CRYSTAL DISPLAY DEVICE AND DISPLAY DEVICE

(75) Inventors: Akihiro Horibe, Yamato (JP); Masaru Suzuki, Yokohama (JP); Takashi Fujita, Kawasaki (JP); Naoya Kushida, Atsugi (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/091,274

(22) Filed: Mar. 5, 2002

(65) Prior Publication Data

US 2002/0126078 A1 Sep. 12, 2002

(30) Foreign Application Priority Data

Mar. 6, 2001 (JP) ........................................ 2001-061120
Mar. 23, 2001 (JP) ........................................ 2001-084432

(51) Int. Cl.[7] .......................................... G02F 1/1335
(52) U.S. Cl. .............................. 349/70; 349/61; 349/71
(58) Field of Search ............................ 349/69, 70, 71; 313/486, 487

(56) References Cited

U.S. PATENT DOCUMENTS 4,945,350 A * 7/1990 Kawamura .................. 345/102
5,757,447 A * 5/1998 Kobayashi et al. ........... 349/70

* cited by examiner

Primary Examiner—Tarifur R. Chowdhury
Assistant Examiner—Michael H Caley
(74) Attorney, Agent, or Firm—Margaret A. Pepper (57) ABSTRACT

A color liquid crystal display device is disclosed which is capable of securing sufficient luminance while achieving a high National Television System Committee (NTSC) ratio. Specifically, a liquid crystal display device is disclosed which includes a cold cathode fluorescent light tube as a light source, and a liquid crystal display panel for displaying images by controlling transmission of light from the cold cathode fluorescent light tube. The liquid crystal display panel includes a color filter substrate having color filter layers of red, green and blue, a thin film transistor (TFT) array substrate, and a liquid crystal material filled between the TFT array substrate and the color filter substrate. The cold cathode fluorescent light tube is a tri-phospher fluorescent fluorescent light tube, which utilizes $Zn_2SiO_4$:Mn as a green phosphor. The cold cathode fluorescent light tube and the color filter layers are optimized in a manner that a color reproduction region of the light emitted from the cold cathode fluorescent light tube through the color filter layers has an NTSC ratio of 85% or higher.

13 Claims, 10 Drawing Sheets

LIQUID CRYSTAL DISPLAY DEVICE AND DISPLAY DEVICE

BACKGROUND OF THE INVENTION

The present invention relates to a display device and a liquid crystal display device, particularly, to a display device and a liquid crystal display device that perform color display by emitting light from a light source through a color filter layer.

In recent years, liquid crystal display devices are utilized in a wide range of fields from medium-sized and large-sized displays used for computers, television sets and the like to small-sized displays used for car navigation systems and mobile telephones. A liquid crystal display device includes a backlight unit and a liquid crystal display panel. The liquid crystal display device performs image display by the liquid crystal display panel that controls transmission of light from the backlight unit.

Among them, active matrix liquid crystal display devices, which use active elements such as thin film transistors (TFTs) and metal-insulator-metal (MIM), are drawing attention because of excellent display characteristics. An active matrix liquid crystal display device normally includes a TFT array substrate having TFTs as active elements being arrayed in a matrix and an opposing substrate that opposes to the TFT array substrate, and liquid crystal is filled between the two substrates.

The liquid crystal display device includes a display region composed of a plurality of pixels, each of which having a display electrode and a TFT. Light transmittance is varied by application of an electric field to the liquid crystal with the display electrode, thus performing image display. In a color liquid crystal display device, a color filter layer for performing color display is normally provided on the opposing substrate. The color filter layer is composed of three layers of red (R), green (G) and blue (B) side by side, and a black matrix layer formed between these respective color filter layers. Each of the color filter layers transmits light of only a specified range of wavelengths, thus displaying a desired color. Each of the pixels performs color display of any one of R, G and B, whereby an entire display screen can display desired color images.

Regarding a color display device including the liquid crystal display device, two important factors are known from the view point of display quality. One is luminance of the display device, and the other is a reproducible range of colors. In order to perform high-definition display, high luminance and a wide reproducible range of colors are required. Particularly, in light of the reproducible range of colors, such color reproducibility is required to approximate assumed primary color coordinates of a National Television System Committee (NTSC) color TV system as closely as possible. That is, it has been deemed ideal to bring an NTSC ratio to 100%. Here, the NTSC ratio refers to an a real ratio of a triangle of a color reproduction region realized by a display device with respect to an area of a triangle formed by a color reproduction region of NTSC in a chromaticity coordinate system.

Nevertheless, it has been deemed impossible to achieve color reproducibility at an NTSC ratio of 100% with a conventional liquid crystal display device. It is attributed to the fact that widening the range of color reproducibility requires either considerable thickening of the color filter or considerable condensing of photosensitive pigments contained in the color filter layer. Thickening a film of the color filter layer incurs two problems. One of the problems is that optical transmittance is largely reduced by thickening the film of the color filter layer (or by condensing the pigments), and thus sufficient luminance cannot be secured. For this reason, in liquid crystal display devices used in general, an NTSC ratio of an LCD used for a note PC has been limited to about 45%, and an NTSC ratio of a stationary-type liquid crystal display monitor has been limited to about 70%.

Moreover, in order to achieve the NTSC ratio of 100% with a conventional fluorescent light tube and a color filter layer, experiments proved that a color filter layer required a thickness of about 8 micrometers. Such thickness outsteps a boundary of practically produceable color filter layers. Of course, the thickness can be reduced if a pigment density is increased. However, the pigment density also has a certain limitation attributable to curing of a base member (acrylic resin and the like) of the color filter layer. Furthermore, increasing energy supplies to a lamp may raise luminance of the lamp, however, such energy supplies are also limited because of problems concerning heat generation, durability of electrodes and the like.

Accordingly, it has been conceived that fluorescent light tubes with higher luminous efficiency were necessary for achieving a high NTSC ratio and securing sufficient luminance at the same time.

Figure 10:
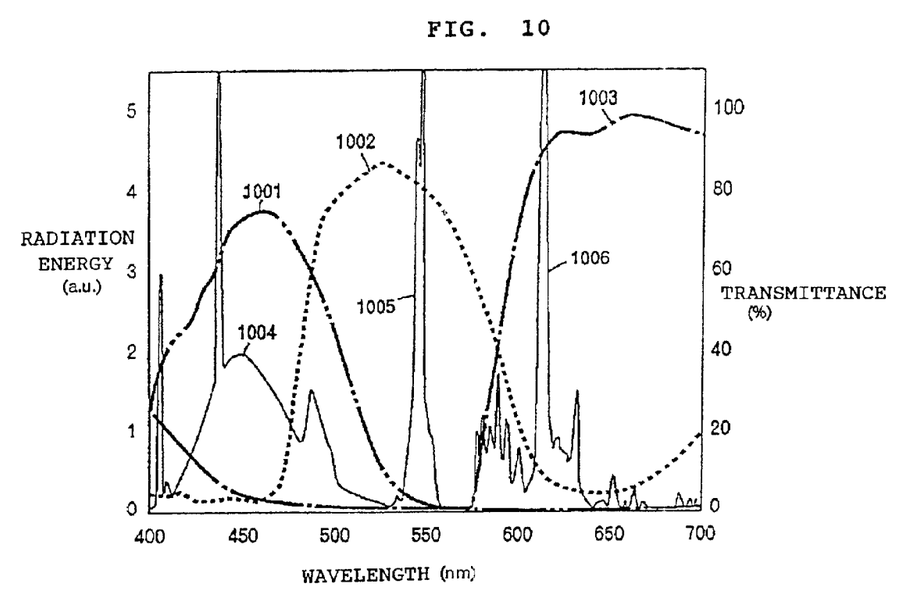
FIG. 10 is a graph showing emission spectra of a cold cathode tube and spectral transmittance of color filter layers of the conventional liquid crystal display device.

FIG. 10 is a graph showing a radiant energy spectrum from a cold cathode fluorescent light tube and spectral transmittance of a color filter layer in a conventional backlight unit. The graph in the drawing corresponds to a conventional liquid crystal display device of an NTSC ratio of 70%. In FIG. 10, the x axis indicates a wavelength of light. The y axis on the left corresponds to a radiant energy spectrum of a lamp, and its unit is an arbitrary unit. The y axis on the right indicates transmittance of a color filter layer. In the drawing, reference numerals 1001, 1002 and 1003 respectively denote spectral transmittance of a blue filter layer, spectral transmittance of a green filter layer and spectral transmittance of a red filter layer.

In the conventional liquid crystal display device, a triphospher fluorescent light tube is used as a light source of the backlight unit. The inside of the fluorescent light tube is coated with three kinds of phosphors, each of which emits light corresponding to RGB, respectively. The backlight unit obtains the light from the light source (the lamp) by allowing the phosphors to emit light. The phosphor s conventionally used are as follows: $BaMg_2Al_{16}O_{27}$:Eu for a blue phosphor; $LaPO_4$:Ce,Tb for a green phosphor; and $Y_2O_3$:Eu for a red phosphor, and the like.

FIG. 10 shows radiant energy spectra of the three kinds of the phosphors, namely, $BaMg_2Al_{16}O_{27}$:Eu, $LaPO_4$:Ce,Tb and $Y_2O_3$:Eu. In FIG. 10, reference numerals 1004, 1005 and 1006 are a radiant energy spectrum of the blue phosphor, a radiant energy spectrum of the green phosphor and a radiant energy spectrum of the red phosphor, respectively. The blue phosphor possesses a maximum peak of the spectrum in the vicinity of 450 nm. The peaks near 405 nm and 435 nm indicate light emission of Hg filled in the fluorescent light tube. The green phosphor possesses a maximum peak of the spectrum in the vicinity of 545 nm and sub peaks respectively in the vicinity of 490 nm, 590 nm and 620 nm. Note that, light emission of Hg is also observed in the vicinity of 580 nm. The red phosphor possesses a maximum peak of the spectrum in the vicinity of 610 nm.

The inventors of the present invention paid attention in particular to the radiant energy spectrum of the conventional green phosphor. The green phosphor possesses two sub peaks apart from the maximum peak. And the sub peak on the short-wave side is located approximately in the middle of a wavelength region where spectral transmittance curves of the blue color filter layer and the green color filter layer overlap. In addition, the sub peak on the long-wave side is located approximately in the middle of a wavelength region where spectral transmittance curves of the green color filter layer and the red color filter layer overlap.

Each of the light at the sub peaks is recognized as a major factor obstructive to color purity of the liquid crystal display device, because the light at the sub peaks is intensely emitted from both of the blue color filter layer and the green color filter layer, or from both of the green color filter layer and the red color filter layer.

Therefore, it is conceivable that a liquid crystal display device of a high NTSC ratio and of high luminance can be obtained if a high-luminance green phosphor without the above-described sub peaks becomes usable. However, such a phosphor higher in luminous efficiency than the conventional green phosphor without light emission corresponding to the above-described sub peaks has not been found to date.

Accordingly, the inventors paid further attention to a relation between transmittance and a film thickness (or a quantity of a photosensitive material) of the color filter layer. The transmittance of the color filter layer decreases exponentially with respect to its thickness. That is, when transmittance of a color filter layer having a thickness of X is Y %, then transmittance of a color filter layer having a thickness of 2× is $Y^2$%. Therefore, an attrition ratio of the luminance becomes larger as the thickness of the color filter layer is increased. The above-described phenomenon is also applicable to density or a quantity of the photosensitive material.

Figure 11:
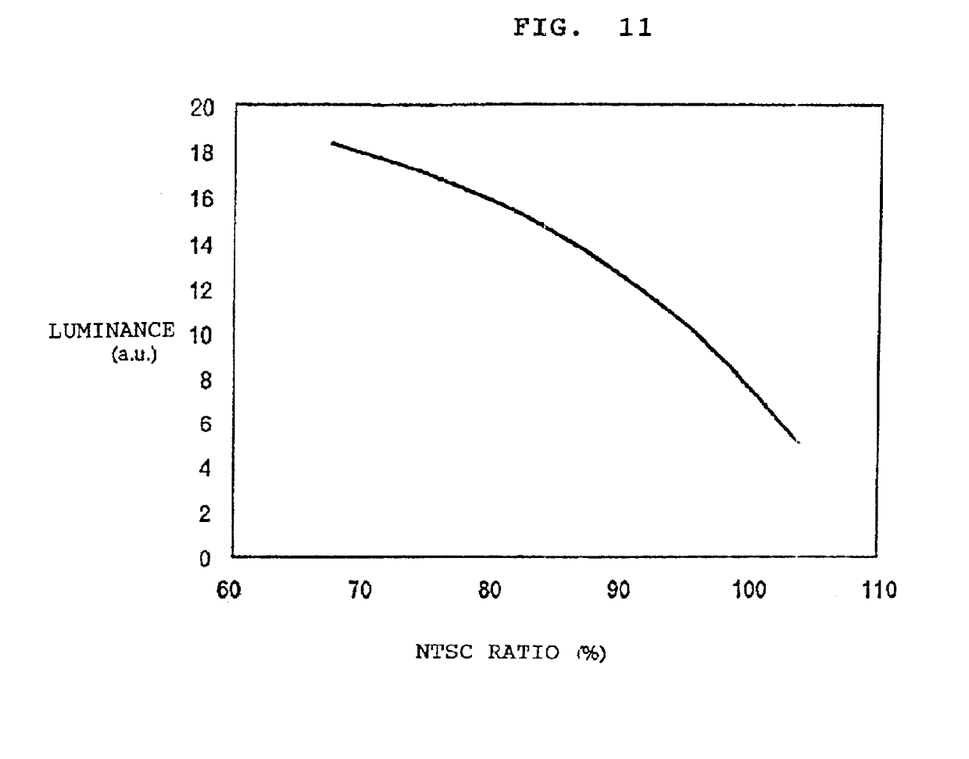
FIG. 11 is a graph showing a relation between an NTSC ratio and luminance in the conventional liquid crystal display device.

FIG. 11 is a graph showing a state how the luminance of the light transmitted through the color filter layer decreases in the case that the thickness of the color filter layer is increased for gaining a larger NTSC ratio in the conventional color filter layer and the cold cathode fluorescent light tube as the light source. In FIG. 11, the y axis indicates a luminance ratio and its unit is an arbitrary unit. The x axis thereof indicates an NTSC ratio of a color reproduction region. As can be understood from the drawing, the luminance is decreased as the NTSC ratio is increased, and in particular, an attrition ratio of the luminance becomes considerably large in a range where the NTSC ratio is about 85% or higher, thus sharply decreasing the luminance.

In other words, the inventors have discovered that the luminance of the light transmitted through the color filter layer can be made larger than the conventional liquid crystal display device of the same NTSC ratio, if a thickness of the color filter layer can be made sufficiently thinner than a conventional thickness in spite of small luminous efficiency as a cold cathode tube.

SUMMARY OF THE INVENTION

Therefore, one object of the present invention is to provide a color display device capable of securing sufficient luminance while achieving a high NTSC ratio.

As a result of devoted research in order to achieve a liquid crystal display device capable of securing sufficient luminance with a high NTSC ratio, particularly one which the NTSC ratio thereof is about 100% which has been previously deemed unpracticable, the inventors have found out the following points.

In order to secure sufficient luminance of a display device in a high NTSC ratio, balancing of radiant energy spectrum distribution of a fluorescent light tube, luminous efficiency thereof and factors of transmittance characteristics of a color filter layer is extremely important, instead of enhancing the luminous efficiency of the fluorescent light tube itself. In other words, the inventors have found out for the first time that luminance larger than that of the conventional liquid crystal display device can be obtained in a region of high NTSC ratios of a display device, even in the case of a fluorescent light tube that is relatively inferior in its luminous efficiency to a conventional fluorescent light tube.

A first aspect of the present invention is a liquid crystal display device including a fluorescent light tube as a light source and a liquid crystal display panel for displaying images by controlling transmission of light from the fluorescent light tube. The liquid crystal display panel includes: a color filter substrate having color filter layers of red, green and blue; an opposing substrate that opposes to the color filter substrate; and a liquid crystal material being filled between the opposing substrate and the color filter substrate. The fluorescent light tube includes a phosphor having 80% or lower luminous efficiency in comparison with $LaPO_4$:Ce, Tb, as a green phosphor. A maximum peak of a radiant energy spectrum of the phosphor is included within a spectral transmissive region of the green color filter layer. In addition, concerning points other than the maximum peak, the radiant energy spectrum of the phosphor increases virtually continuously in a wavelength region where spectral transmissive regions of the blue and the green color filter layers overlap. The fluorescent light tube and the color filter layers have a relation in that a color reproduction region of the light emitted from the fluorescent light tube through the color filter layers has an NTSC ratio of 85% or higher.

It is preferable that the radiant energy spectrum of the phosphor decreases virtually continuously in a wavelength region where the spectral transmissive regions of the green color filter layer and of the red color filter layer overlap, concerning the points other than the maximum peak. Moreover, it is preferable that a wavelength of the maximum peak of the radiant energy spectrum of the green phosphor is included within a wavelength region having 90% or higher transmittance of the maximum transmittance of the green color filter layer. Alternatively, it is preferable that the maximum transmittance of the green color filter layer is 55% or higher and the maximum transmittance of the blue color filter layer is 40% or higher.

A second aspect of the present invention is a liquid crystal display device including a backlight unit and a liquid crystal display panel for displaying images by controlling transmission of light from the backlight unit. The liquid crystal display panel includes: a color filter substrate having color filter layers of red, green and blue; an opposing substrate that opposes to the color filter substrate; and a liquid crystal material being filled between the opposing substrate and the color filter substrate. The backlight unit includes a plurality of cold cathode tubes, the plurality of cold cathode tubes being disposed in the back of the liquid crystal display panel and having any one of $Zn_2SiO_4$:Mn and $3(Ba,Mg,Eu,Mn)0.8Al_2O_3$ as a green phosphor. The liquid crystal display device further includes a diffusion plate that is disposed between the plurality of cold cathode tubes and the liquid crystal display panel and diffuses the light from the cold cathode tubes.

Preferably, the plurality of cold cathode tubes and the color filter layers have a relation in that a color reproduction region of the light emitted from the plurality of cold cathode tubes through the color filter layers has an NTSC ratio of 85% or higher.

A third aspect of the present invention is a liquid crystal display device including a fluorescent light tube as a light source and a liquid crystal display panel for displaying images by controlling transmission of light from the fluorescent light tube. The liquid crystal display panel includes: a color filter substrate having color filter layers of red, green and blue; an opposing substrate that opposes to the color filter substrate; and a liquid crystal material being filled between the opposing substrate and the color filter substrate. The fluorescent light tube includes a phosphor having 80% or lower luminous efficiency in comparison with $LaPO_4$:Ce, Tb, as a green phosphor. A maximum peak of a radiant energy spectrum of the green phosphor is included within a spectral transmissive region of the green color filter layer, and the radiant energy spectrum of the green phosphor has a value not exceeding 20% of a maximum peak value of a radiant energy spectrum of a blue phosphor coated inside the fluorescent light tube, at a wavelength where spectral transmittance curves of the blue and the green color filter layers intersect. The fluorescent light tube and the color filter layers have a relation in that a color reproduction region of the light emitted from the fluorescent light tube through the color filter layers has an NTSC ratio of 85% or higher.

A fourth aspect of the present invention is a display device including a tri-phosphor fluorescent light tube, optical elements for controlling transmission of light from the tri-phosphor fluorescent light tube, and a substrate having color filter layers of red, green and blue. The tri-phosphor fluorescent light tube has three kinds of phosphors, each of which radiates any one of blue, green and red light, respectively, and has luminous efficiency not exceeding 90% of a tri-phosphor fluorescent light tube having $BaMg_2Al_{16}O_{27}$:Eu, $LaPO_4$:Ce,Tb and $Y_2O_3$:Eu as phosphors. In addition, radiant energy of the tri-phosphor fluorescent light tube at a wavelength where spectral transmittance curves of the blue and the green color filter layers intersect is 50% of a maximum peak of radiant energy of the blue phosphor or less. The tri-phosphor fluorescent light tube and the color filter layers have a relation in that a color reproduction region of the light emitted from the tri-phosphor fluorescent light tube through the color filter layers has an NTSC ratio of 85% or higher.

A fifth aspect of the present invention is a display device including: a fluorescent light tube having any one of $Zn_2SiO_4$:Mn and 3(Ba,Mg,Eu,Mn)0.8$Al_2O_3$ as a phosphor; optical elements for controlling transmission of light from the fluorescent light tube; and a substrate having color filter layers of red, green and blue. The fluorescent light tube and the color filter layers have a relation in that a color reproduction region of the light emitted from the fluorescent light tube through the color filter layers has an NTSC ratio of 85% or higher.

Preferably, a color reproduction region of the light emitted through the color filter layers has an NTSC ratio of 100% or higher. Preferably, a wavelength of a maximum peak of a radiant energy spectrum of the green phosphor is included within a wavelength region having 90% or higher transmittance of the maximum transmittance of the green color filter layer. Alternatively, it is preferable that the maximum transmittance of the light of the green color filter layer is 55% or higher, and the maximum transmittance of the light of the blue color filter layer is 40% or higher. The display device may possibly take the form of a liquid crystal display device. The liquid crystal display device includes a first transparent substrate, a second transparent substrate, and a liquid crystal display panel having a liquid crystal material filled between the first and the second transparent substrates as the optical elements. The liquid crystal display panel includes a color filter layer and a plurality of pixel electrodes being transparent electrodes arranged in a matrix, for applying electric fields to the liquid crystal material.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

Now, description will be made by taking a liquid crystal display device as an example for one embodiment of application of the present invention. For a liquid crystal display device of a high NTSC ratio, the embodiment utilizes a phosphor low in luminous efficiency in comparison with a conventional one. Even if a lamp has low luminous efficiency, a liquid crystal display device of higher luminance than a conventional one is obtainable out of a liquid crystal display device of a high NTSC ratio, Here, the luminous efficiency refers to luminance of light emission in the case when a specified quantity of electric power (e.g., 1 W) is supplied. As for the unit of luminance, lumen (lm) as the unit of luminous flux is used.

Figure 1:
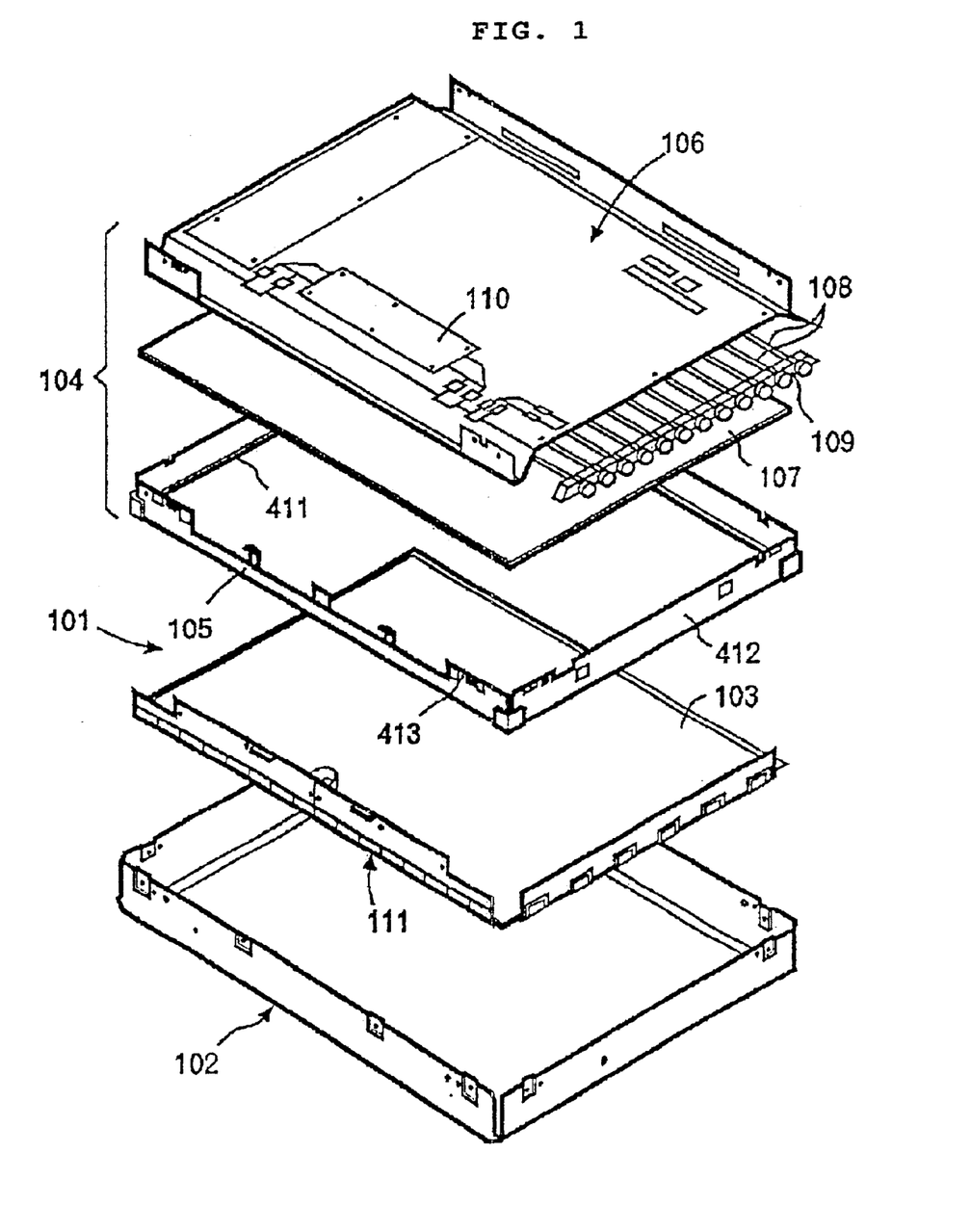
FIG. 1 is an exploded perspective view for describing a structure of a liquid crystal display device according to an embodiment of the present invention.

FIG. 1 is a perspective view of a liquid crystal display device, which is one embodiment of the present invention. Each of components are illustrated in a separated state.

A liquid crystal display device 101 comprises a bezel 102, a liquid crystal display panel 103 and a backlight unit 104; and the backlight unit 104 is a direct-type planar light source unit. Images are displayed by the liquid crystal display panel 103 controlling quantities of transmission of the light emitted from an optical emission surface of the backlight unit 104.

The backlight unit 104 includes a front frame 105 and a rear frame 106, and a diffusion plate 107 is disposed therebetween. In a position facing a back surface of the diffusion plate 107 and within the rear frame 106, disposed are a plurality of cold cathode fluorescent light tubes 108 collectively as a light source. The cold cathode fluorescent light tubes 108 are disposed on a back surface of the liquid crystal display panel 103. Light emitted from the light source passes through the diffusion plate 107, is diffused almost uniformly, and is emitted out of an optical emission surface of the diffusion plate 107. The diffusion plate 107 is held as sandwiched between the front frame 105 and the rear frame 106. The diffusion plate 107 is made of resin such as acrylic resin, and it has a function of uniformizing luminance of the light from the light source.

Both ends of the plurality of cold cathode fluorescent light tubes 108 are fixed to a lamp holder 109. By using the plurality of cold cathode tubes, luminance is enhanced. The lamp holder 109 is fixed to an internal surface of the rear frame 106 with a screw. Light reflective sheets are stuck on the internal surface of the rear frame 106, thus effectively reflecting the light from the cold cathode fluorescent light tubes 108 toward the side of the liquid crystal display panel. Moreover, on a back surface of a bottom portion of the rear frame, provided is a circuit substrate 110 for connecting with the cold cathode fluorescent light tubes 108. The circuit substrate 110 includes electric power circuits such as a DC—DC converter and inverter circuits.

The liquid crystal display panel 103 includes two transparent substrates fixed with a seal adhesive, and a liquid crystal material is filled between the substrates. One of the substrates is an array substrate on which switching elements are arrayed in a matrix, and the other is a color filter substrate having color filter layers of red (R), green (G) and blue (B). There is also another type of the liquid crystal display panel 103, which does not include the switching elements. The liquid crystal display panel 103 is fixed to the front frame 105 with an elastic double-sided tape. On two side edges of the array substrate, connected are tape carrier packages (TCPs) 111 with anisotropic conductive films (ACFs). Normally, a plurality of source driver ICs for signal lines are provided on one side of the TFT array, and a plurality of gate driver ICs for gate lines that control gate voltages are provided on the other side thereof. The TCP 111 includes a film 112 formed with wiring and a driver IC 113 disposed on the film 112. It should be noted that the driver IC may be directly disposed on the array substrate as well.

As for a backlight unit, there is also a sidelight backlight unit besides the above-described direct backlight unit. The sidelight backlight unit generally includes a light guide plate, a reflective sheet, a diffusion sheet, a prism sheet having a light condensing function, and one or plural cold cathode tube as a light source. The cold cathode tube is disposed along a side surface of the light guide plate. The reflective sheet is disposed on a back surface of the light guide plate for reflecting the light emitted out of the back surface of the light guide plate. The diffusion sheet is normally disposed on the front surface of the light guide plate, for diffusing the light emitted out of the light guide plate and uniformizing it. The prism sheet is disposed on the diffusion sheet, for allowing the incident light to be emitted out such that the light is collimated within a viewing angle. The light emitted from the light source is made incident into the light guide plate from the side surface of the light guide plate, propagates inside the light guide plate, and then is emitted out of a top surface of the light guide plate toward the liquid crystal display panel via the diffusion sheet and the prism sheet.

Each pixel electrode applies an electric field of specified intensity to liquid crystal of a selected pixel based on a gate voltage inputted by the driver IC 113 and a display signal voltage. The voltage inputted by the source driver IC is sent to a display electrode via a source/drain of a TFT, then the display electrode applies an electric field to the liquid crystal. By changing the voltage, an applied voltage to the liquid crystal can be modulated, thus controlling transmittance of the light from the backlight unit in a liquid crystal material layer. Since each pixel performs color display of any one of RGB, a desired color image can be displayed on the whole display screen.

Figure 2:
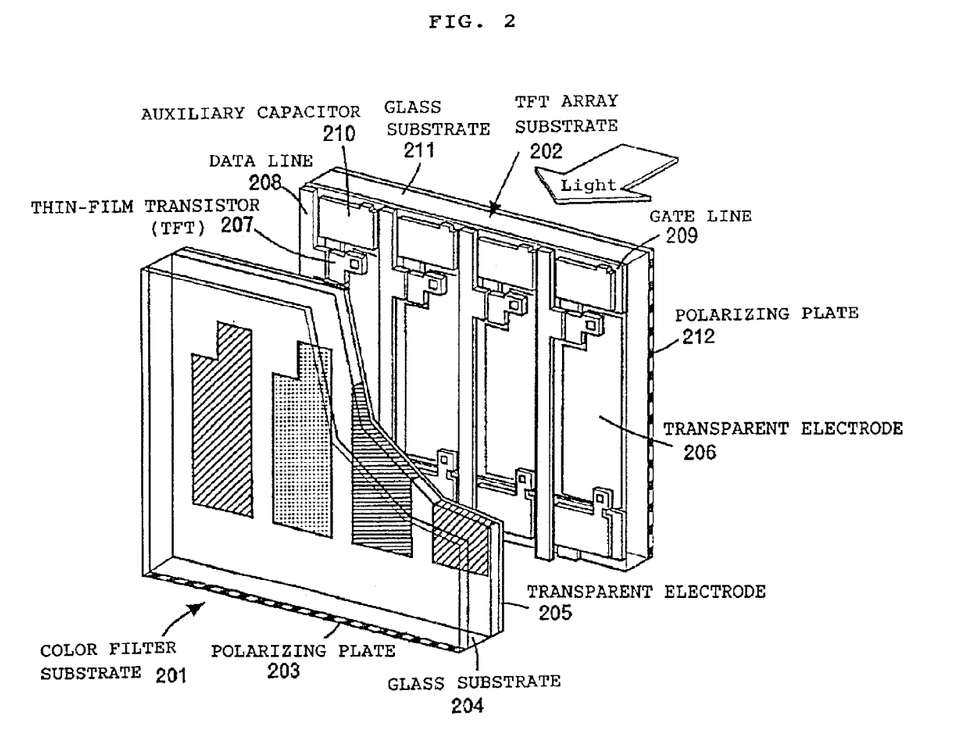
FIG. 2 is an exploded perspective view for describing a structure of a liquid crystal display panel of the liquid crystal display device of the embodiment.

FIG. 2 shows an area including four pixels, which is a part of a display area of the TFT liquid crystal display panel 103. The drawing includes a color filter substrate 201 and a TFT array substrate 202, these substrates being disposed with a space of about 5 micrometers to each other with a spacer, and a liquid crystal material is filled in this space. The color filter substrate 201 includes a polarizing plate 203 that polarizes transmitted light, a glass substrate 204, and color filter layers of three colors of red (R), blue (B) and green (G). Moreover, the color filter substrate 201 further includes an indium tin oxide (ITO) transparent electrode thin-film layer 205 as a display electrode for applying an electric field to the liquid crystal. The color filter layers can be also formed on the TFT array substrate 202.

The TFT array substrate 202 includes ITO transparent display electrodes 206, thin-film transistors (TFTs) 207 as switching elements, data lines 208 for forwarding display signals, gate lines 209 for controlling gate voltages, auxiliary capacitors 210, a glass substrate 211 and a polarizing plate 212 for polarizing transmitted light. On facing surfaces of the both substrates, provided are alignment layers that align the liquid crystal. Note that the embodiment explains a twisted nematic (TN) system, however, the present invention is by all means applicable to an in-plane switching (IPS) system that has a common electrode and a display electrode on one substrate, and to a VA system as well.

The color filter layer is an acrylic base member with pigments dispersed therein. As for a color filter layer, besides the above-described type, there are ones using polyimide or epoxy resin as a base member, or ones using dyes as a photosensitive material instead of the pigments. As for examples of the pigments, quinacridone pigments (red), disazo yellow (yellow), phthalocyanine green (green), dioxane violet, phthalocyanine blue and the like are known, and a color filter layer of a desired color is obtained by mixing the above. Moreover, various methods such as a pigment dispersion method, a dyeing method and an electrodeposition method are known as manufacturing methods of the color filter layer. As these methods are already widely known technologies, description thereto will be omitted in this specification.

In the embodiment, utilized is a green phosphor which has never been used as a light source of a liquid crystal display device because of its lower luminous efficiency in comparison with the conventional green phosphors. A phosphor of low luminous efficiency is an unsuitable phosphor for a liquid crystal display device in general use. It is particularly because luminance of a light source is an extremely important factor in a liquid crystal display device, since transmittance of light from the light source in a color liquid crystal display device is extremely small such as about 3 to 6%.

Figure 3:
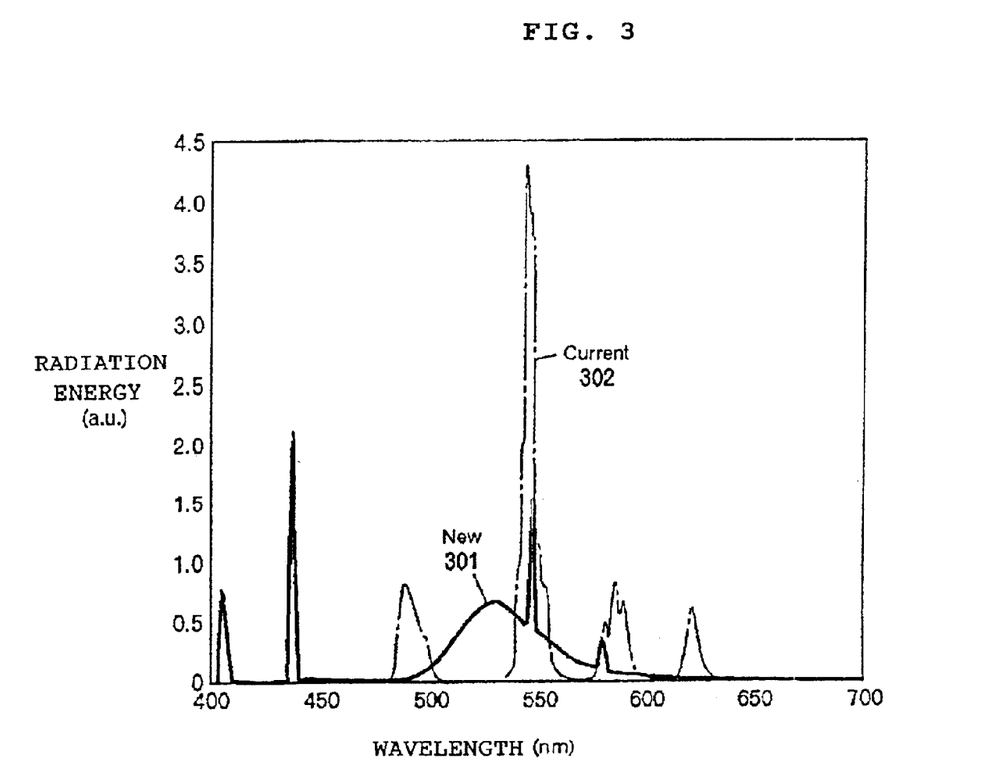
FIG. 3 is a graph for comparing an emission spectrum of a green phosphor of the embodiment with an emission spectrum of a conventional green phosphor.

FIG. 3 is a graph showing a radiant energy spectrum of $Zn_2SiO_4$:Mn, which is one example of the green phosphor used in the present invention. In FIG. 3, a reference numeral 301 denotes the radiant energy spectrum of $Zn_2SiO_4$:Mn, and a reference numeral 302 denotes a radiant energy spectrum of $LaPO_4$:Ce,Tb, which is a conventional phosphor. FIG. 3 illustrates ratios of the radiant energy spectra in the case where the same energy is bestowed on the phosphors. The x axis indicates an optical wavelength. The y axis indicates an energy ratio, and its unit is an arbitrary unit. $Zn_2SiO_4$:Mn has a maximum peak at about 530 nm and no sub peaks in other wavelengths. The peaks observed at about 405, 435, 545 and 580 nm are light emission of Hg filled in a cold cathode fluorescent light tube. It is preferable that the radiant energy spectrum of the phosphor has a main peak within a spectral transmissive wavelength region of the green color filter layer, and that it does not have any other sub peaks. It should be noted that a hot cathode tube may be also usable for a fluorescent light tube. However, considering its physical dimension, a cold cathode tube is preferable. Furthermore, there are also Ar, Ne and the like for gases to be filled in the fluorescent light tube besides Hg. Since the radiant energy spectrum of $LaPO_4$:Ce,Tb has been described already, description in this regard will be omitted here.

As can be understood from FIG. 3, the luminous efficiency of $Zn_2SiO_4$:Mn is smaller than the luminous efficiency of $LaPO_4$:Ce,Tb, which is about 72% of the luminous efficiency of $LaPO_4$:Ce,Tb. This is obtainable by comparing the luminance of light emission by coating the same amount of phosphors on cold cathode fluorescent tubes of the same type, and by applying the electric power of the same energy. Whereas larger is better in luminous efficiency of a phosphor, even in the case of the phosphor having the luminous efficiency of 80% or lower in comparison with $LaPO_4$:Ce,Tb, a liquid crystal display device having sufficient luminance, which is of higher luminance than a conventional liquid crystal display device at a high NTSC ratio, can be obtained by performing optimization between the phosphor and the color filter layers. Notwithstanding the foregoing, the luminous efficiency should be preferably 50% or higher in comparison with $LaPO_4$:Ce,Tb, and more preferably about 60% or higher.

Besides $Zn_2SiO_4$:Mn, $3(Ba,Mg,Eu,Mn)0.8Al_2O_3$ and the like is usable as the green phosphor.

Figure 4:
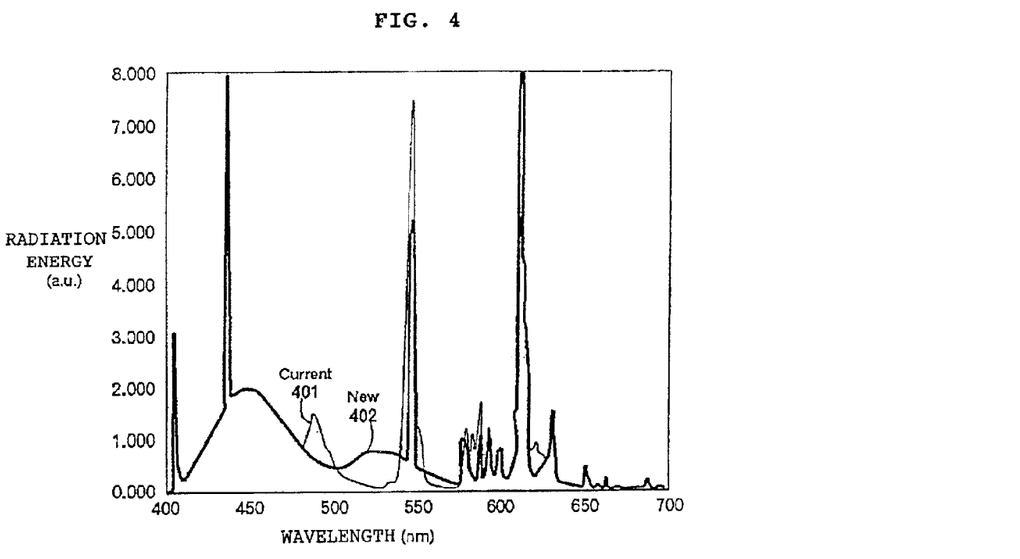
FIG. 4 is a graph for comparing an emission spectrum of a cold cathode tube of the embodiment with an emission spectrum of a conventional cold cathode tube.

FIG. 4 is a graph that compares emission spectra of the cold cathode fluorescent light tube in which $Zn_2SiO_4$:Mn is used as the green phosphor and the conventional cathode fluorescent light tube using $LaPO_4$:Ce,Tb as the green phosphor, wherein conventional $BaMg_2Al_{16}O_{27}$:Eu and $Y_2O_3$:Eu are used in the both cases as blue and red phosphors, respectively. In FIG. 4, a reference numeral 401 denotes the emission spectrum of the conventional cold cathode fluorescent light tube and a reference numeral 402 denotes the emission spectrum of the cold cathode fluorescent light tube of the embodiment. The coordinate axes thereof are similar to those in FIG. 3. It should be noted that the emission spectrum of each of the cold cathode fluorescent light tubes is variable to some extent by varying a composition ratio of the phosphors.

Luminous efficiency as a lamp depends on a synthesis of the three phosphors. A liquid crystal display device having sufficient luminance, which is of higher luminance than a conventional liquid crystal display device at a high NTSC ratio, can be obtained by performing optimization between the phosphors and the color filter layers, even in the case of the cold cathode fluorescent light tube of which luminous efficiency is 90% or lower in comparison with the cold cathode fluorescent light tube having the conventional phosphors. Notwithstanding the foregoing, the luminous efficiency should be preferably about 75% or higher in comparison with the conventional cold cathode fluorescent light tube.

Figure 5:
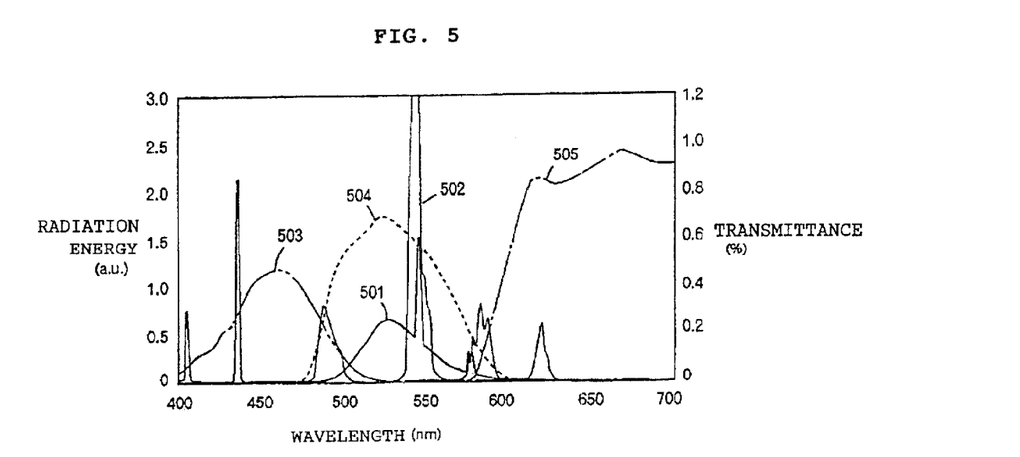
FIG. 5 is a graph showing the emission spectrum of the green phosphor of the embodiment, the emission spectrum of the conventional green phosphor, and spectral transmittance of color filter layers of the embodiment.

FIG. 5 is a view showing a relation between an emission spectrum of the green phosphor and a transmittance spectrum of the color filter layer. In FIG. 5, the x axis indicates an optical wavelength. The y axis on the left indicates an energy ratio of the emission spectrum and its unit is an arbitrary unit. The y axis on the right indicates transmittance of the color filter layer. The transmittance in the drawing is of the color filter layer that achieves an NTSC ratio of 100% by use of the cold cathode fluorescent light tube of the embodiment. In the drawing, a reference numeral 501 denotes an emission spectrum of $Zn_2SiO_4$:Mn and a reference numeral 502 denotes an emission spectrum of $LaPO_4$:Ce,Tb. Reference numerals 503, 504 and 505 denote spectral transmittance of color filter layers of blue, green and red, respectively.

The blue color filter layer 503 possesses a transmittance peak at about 465 nm, and its transmittance is about 50%. Moreover, where the transmittance is about 25%, a wavelength on the short-wave side is about 430 nm and a wavelength on the long-wave side is about 490 nm. Accordingly, its half-width is about 60 nm.

The green color filter layer 504 possesses a transmittance peak at about 525 nm, and its transmittance is about 70%. Moreover, where the transmittance is about 35%, a wavelength on the short-wave side is about 490 nm and a wavelength on the long-wave side is about 570 nm. Accordingly, its half-width is about 80 nm.

The red color filter layer 505 transmits light of which wavelength is about 580 nm or longer. A long-wave side region above 700 nm is not plotted.

The transmittance spectrum of the color filter layer is variable in a small range by selection of materials or variation of composition ratios of pigments for each color.

As can be understood from FIG. 5, a radiant energy spectrum of the green phosphor of the embodiment possesses a maximum peak at a point almost coincident with the transmittance peak of the green color filter layer 504, and it does not have any other sub peaks. It is preferable that the maximum peak wavelength of the green phosphor is included within a wavelength region having 90% or higher transmittance of the maximum transmittance of the green color filter layer. It is important that the spectral curve increases or decreases virtually continuously within a wavelength region where the transmittance spectra of the blue and the green color filter layers overlap and within a wavelength region where the transmittance spectra of the red and the green color filter layers overlap, and that the spectral curve does not possess sub peaks within those regions or does not possess major sub peaks within those regions.

It is particularly important that the spectral curve does not possess major sub peaks within the wavelength region where the transmittance spectra of the blue and the green color filter layers overlap. For one thing, it is because that an intersection point of the spectral transmittance curves of the blue and the green color filter layers, that is, the maximum transmittance within the region where the spectral transmittance curves overlap (the point where the transmittance of the two color filter layers is the same) is large. In the conventional green phosphor, since the wavelength of the maximum transmittance and the wavelength of the sub peak almost coincide with each other, occurrence of considerable energy radiation would bring a major factor obstructive to achieve a high NTSC ratio. Therefore, at the wavelength of the maximum transmittance, it is preferable that the radiant energy of the green phosphor is 20% or lower of the maximum peak of the blue phosphor, regardless of the presence or absence of the sub peak.

Figure 6:
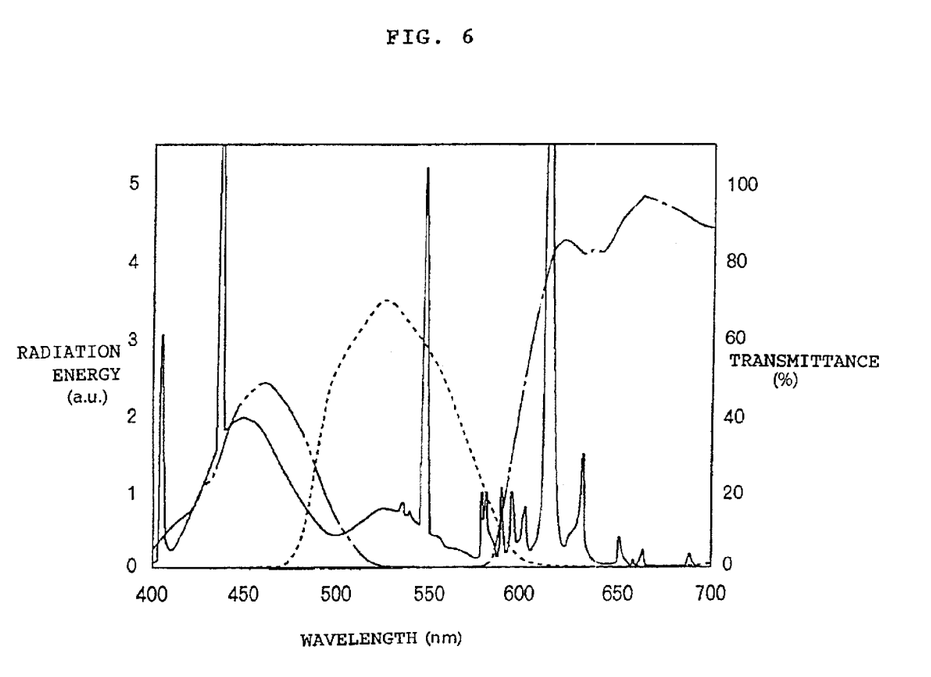
FIG. 6 is a graph showing the emission spectrum of the cold cathode tube of the embodiment and spectral transmittance of the color filter layers.

FIG. 6 is a view showing a relation between the emission spectra of the cold cathode fluorescent light tube of the embodiment and the conventional cold cathode fluorescent light tube, and the spectral transmittance of the color filter layer. The transmittance in the drawing is of the color filter layer that achieves an NTSC ratio of 100% by use of the cold cathode fluorescent light tube of the embodiment.

There are no sub peaks of the emission spectrum within a wavelength region where the transmittance spectra of the blue and the green color filters overlap. The radiant energy of the fluorescent light tube at the intersection point of the spectral transmittance curves of the blue and the green color filter layers should be preferably 50% or lower of the maximum peak of the blue phosphor, more preferably, 40% or lower thereof, regardless of the presence or absence of the sub peak.

A sub peak of the red phosphor is observed in the wavelength region where the transmittance spectra of the red and the green color filter layers overlap. However, it is not largely influential in achieving a high NTSC ratio, as its peak value is small and the transmittance of the color filter layer is also as small as about 10%.

Figure 7:
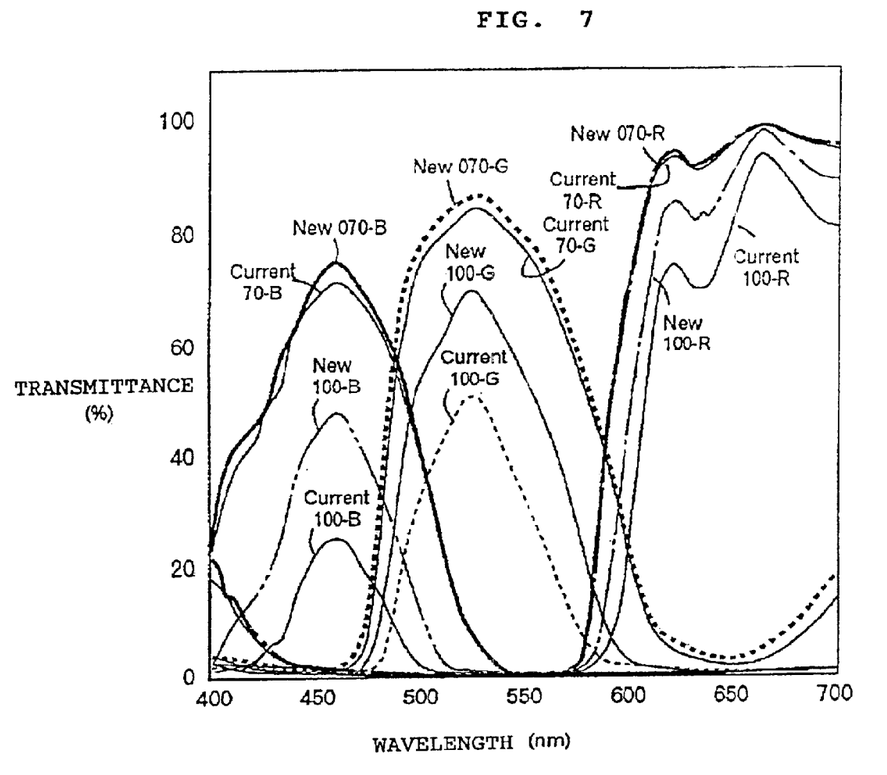
FIG. 7 is a graph for comparing the spectral transmittance of the color filter layers of the embodiment with spectral transmittance of color filter layers of a conventional liquid crystal display device.

FIG. 7 shows spectral transmittance of color filter layers. Graphs in FIG. 7 represent respectively in the order of larger transmittance: spectral transmittance in the case where the cold cathode fluorescent light tube of the embodiment is used and its NTSC ratio is set to 70% (New 070); spectral transmittance in the case where the conventional cold cathode tube is used and its NTSC ratio is set to 70% (Current 070); spectral transmittance in the case where the cold cathode fluorescent light tube of the embodiment is used and its NTSC ratio is set to 100% (New 100); and spectral transmittance in the case where the conventional cold cathode tube is used and its NTSC ratio is set to 100% (Current 100). Each spectral transmittance has color filter layers of blue (B), green (G) and red (R).

A considerable decrease in the transmittance of the color filter layers is observed in the case where the conventional cold cathode fluorescent light tube is used for achieving the NTSC ratio of 100%. Specifically, the maximum transmittance of the blue color filter layer drops down to about 30%, and the maximum transmittance of the green color filter layer drops down to about 50%.

On the contrary, when the transmittance of the color filter layers at the NTSC ratio of 70% and the transmittance of the color filter layers at the NTSC ratio of 100% are compared in a display device of the embodiment, a decrease in the transmittance is small. In order to achieve the NTSC ratio of 100%, the maximum transmittance of the blue color filter layer is about 50% and the maximum transmittance of the green color filter layer is about 70%. This fact indicates that the cold cathode fluorescent light tube and the color filter layers are well combined in the display device of the embodiment, within a range of a high NTSC ratio yet to largely sacrifice the transmittance of the color filter layers. The reason is that the NTSC ratio can be raised up to 100% before the transmittance of the color filter layers starts to drop down sharply. A high NTSC ratio is desirable in order to secure sufficient luminance as a liquid crystal display device, in particular, in a state such that the maximum transmittance of the green color filter layer is 55% or higher at the NTSC ratio of 85% or higher. Moreover, the maximum transmittance of the blue color filter layer should be preferably 40% or higher. It is because enlargement of the film thickness of the color filter layers is required to achieve lower transmittance, which may incur a problem from a viewpoint of mass production.

Figure 8:
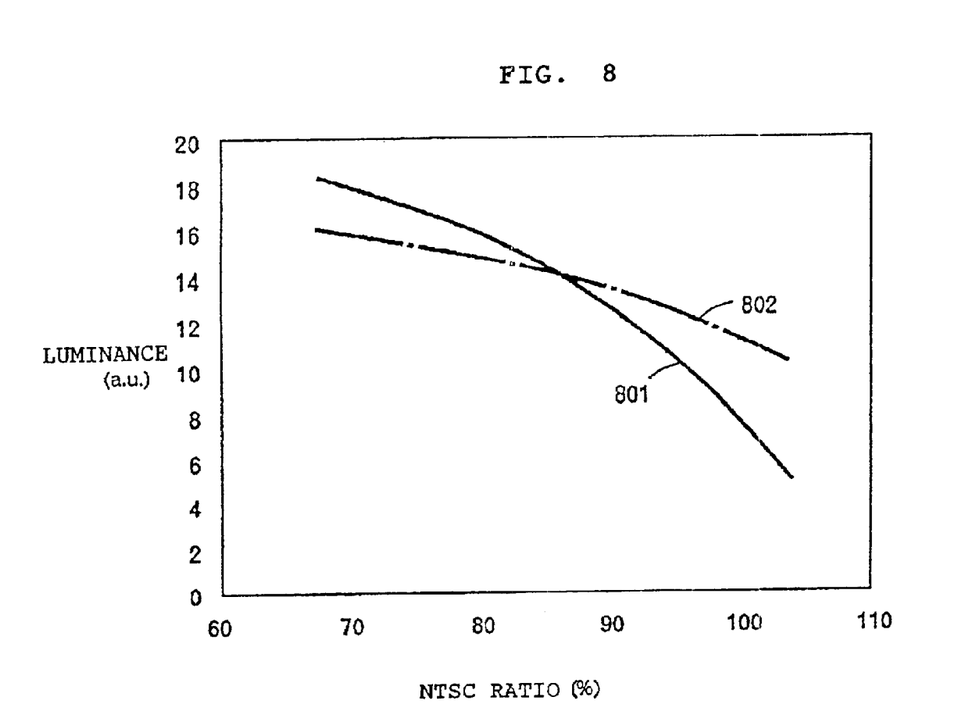
FIG. 8 is a graph for describing variation of luminance with respect to an NTSC ratio between the conventional liquid crystal display device and the liquid crystal display device of the embodiment.

FIG. 8 is a graph for describing variation of luminance with respect to NTSC ratios between the conventional liquid crystal display device and the liquid crystal display device of the embodiment. The x axis indicates an NTSC ratio and they axis indicates a luminance ratio. In FIG. 8, a reference numeral 801 denotes luminance of the conventional liquid crystal display device, and a reference numeral 802 denotes luminance of the liquid crystal display device of the embodiment. The unit for the y axis is an arbitrary unit. In a region where the NTSC ratio is small, or when the NTSC ratio is 70%, for example, the conventional liquid crystal display device achieves higher luminance than the embodiment. However, in a region of a high NTSC ratio, i.e., in the region of the NTSC ratio of 85% or higher, it is recognized that the liquid crystal display device of the embodiment shows higher luminance than the conventional liquid crystal display device.

In other words, the luminance of the liquid crystal display device of the embodiment is smaller than that of the conventional liquid crystal display device in the low NTSC ratio because luminance of the cold cathode fluorescent light tube of the embodiment is smaller than that of the conventional cold cathode fluorescent light tube. On the contrary, in the range of the high NTSC ratio, the liquid crystal display device of the embodiment can achieve the high NTSC ratio without largely decreasing the transmittance of the color filter layers, because the thickness of the color filter layers is sufficiently small (or quantities of photosensitive materials are sufficiently small) in comparison with the conventional liquid crystal display device.

Figure 9:
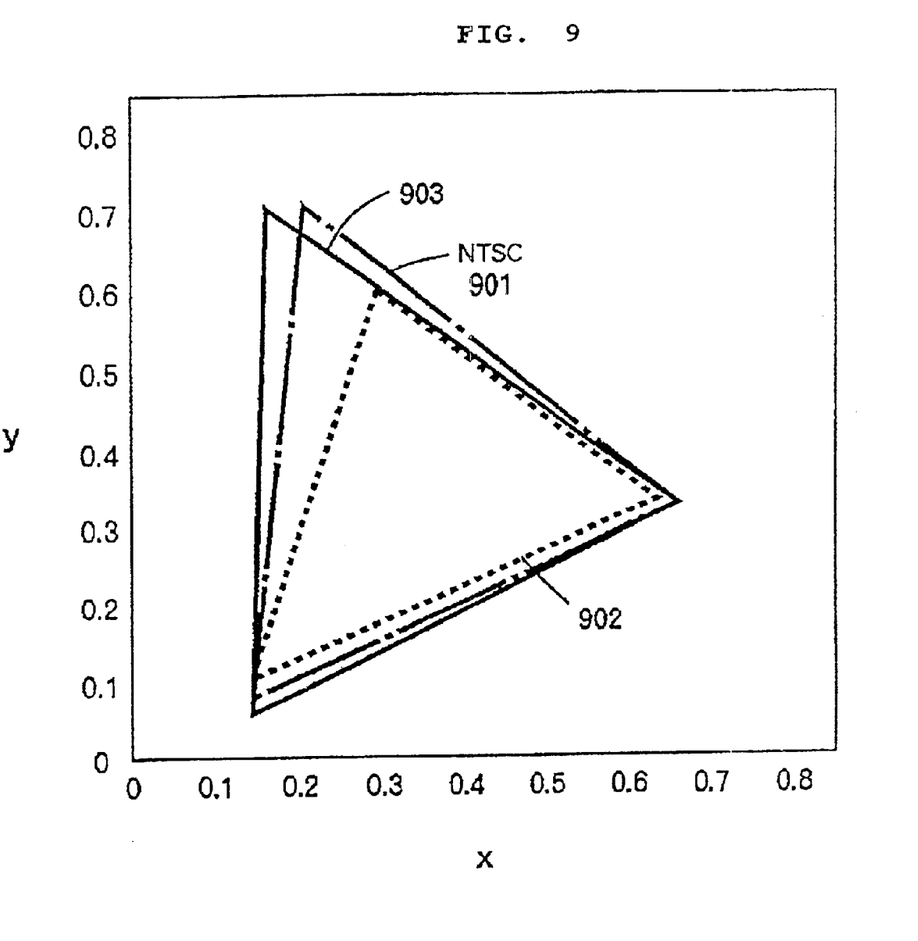
FIG. 9 is chromaticity coordinates for showing color reproduction regions.

FIG. 9 is chromaticity coordinates showing color reproduction regions. In FIG. 9, a reference numeral 901 denotes an NTSC color reproduction region, a reference numeral 902 denotes a color reproduction region of the conventional liquid crystal display device at the NTSC ratio of 70%, and a reference numeral 903 denotes a color reproduction region of the liquid crystal display device of the embodiment. Regarding the chromaticity coordinates, a larger area means a wider range of color reproducibility. As can be understood from the drawing, the color reproduction region 903 of the embodiment achieves the NTSC ratio of 100% or higher. Improvements in color purity of green and color purity of blue are observed in the liquid crystal display device of the embodiment in comparison with that of the conventional liquid crystal display device.

Furthermore, the liquid crystal display device of the embodiment can secure sufficient luminance. As described above, the embodiment can achieve a liquid crystal display device having a high NTSC ratio and high luminance, which has been previously deemed unpracticable.

It is needless to say that the scope of the present invention is not limited to the above-described embodiment. For those skilled in the art, it is easy to modify or change the components of the above-described embodiment within the scope of the present invention. For example, although the embodiment has been described regarding a liquid crystal display device, applications of the present invention are not limited to liquid crystal display devices. The present invention is also applicable to other color display devices having a color filter and a fluorescent light tube as a light source. Moreover, the liquid crystal display device is not limited to that of an active matrix type, but it is also applicable to that of a super twisted nematic (STN) type and the like. As for blue and red phosphors, phosphors other than the substances of the phosphors cited herein are also usable.

Although the preferred embodiments of the present invention have been described in detail, it should be understood that various changes, substitutions and alternations can be made therein without departing from spirit and scope of the inventions as defined by the appended claims.

What is claimed is:

1. A liquid crystal display device comprising:
a fluorescent light tube as a light source, and
a liquid crystal display panel for displaying images by controlling transmission of light from said fluorescent light tube;
said liquid crystal display panel including:
a color filter substrate having color filter layers of red, green and blue,
an opposing substrate opposed to said color filter substrate, and
a liquid crystal material being filled between said opposing substrate and said color filter substrate;
wherein said fluorescent light tube includes a phosphor having luminous efficiency equivalent to 80% and below in comparison with $LaPO_4:Ce,Tb$ as a green phosphor,
a maximum peak of a radiant energy spectrum of said phosphor is included within a spectral transmissive region of said green color filter layer,
said radiant energy spectrum of said phosphor increases virtually continuously concerning points other than said maximum peak within a wavelength region where spectral transmissive regions of said blue and said green color filter layers overlap, and
said fluorescent light tube and said color filter layers have a relation such that a color reproduction region of light emitted from said fluorescent light tube through said color filter layers has an NTSC ratio of 85% or higher.

2. The liquid crystal display device according to claim 1, wherein said radiant energy spectrum of said green phosphor decreases virtually continuously concerning points other than said maximum peak within a wavelength region where spectral transmissive regions of said green color filter layer and said red color filter layer overlap.

3. The liquid crystal display device according to claim 1, wherein a wavelength of said maximum peak of the radiant energy spectrum of said green phosphor is included within a wavelength region having transmittance of 90% or higher of maximum transmittance of said green color filter layer.

4. The liquid crystal display device according to claim 1, wherein maximum transmittance of light of said green color filter layer is 55% or higher, and maximum transmittance of light of said blue color filter layer is 40% or higher.

5. A liquid crystal display device comprising a backlight unit and a liquid crystal display panel for displaying images by controlling transmission of light from said backlight unit,
wherein said liquid crystal display panel includes:
a color filter substrate having color filter layers of red, green and blue,
an opposing substrate that opposes to said color filter substrate, and
a liquid crystal material being filled between said opposing substrate and said color filter substrate; and
said backlight unit includes:
a plurality of cold cathode tubes being disposed on a back surface of said liquid crystal display panel and having any one of $Zn_2SiO_4:Mn$ and $3(Ba,Mg,Eu,Mn)0.8Al_2O_3$ as a green phosphor, and
a diffusion plate being disposed between said plurality of cold cathode tubes and said liquid crystal display panel, said diffusion plate being for diffusing light from said plurality of cold cathode tubes;
wherein said plurality of cold cathode tubes and said color filter layers have a relation in that a color reproduction region of light emitted from said plurality of cold cathode tubes through said color filter layers has an NTSC ratio of 85% or higher.

6. The liquid crystal display device according to claim 1, wherein said radiant energy spectrum of said green phosphor has a value equivalent to 20% or lower of a maximum peak value of a radiant energy spectrum of a blue phosphor being coated inside said fluorescent tube at a wavelength where spectral transmittance curves of said blue and said green color filter layers intersect.

7. The liquid crystal display device according to claim 6, wherein a wavelength of said maximum peak of the radiant energy spectrum of said green phosphor is included within a wavelength region having transmittance of 90% or higher of maximum transmittance of said green color filter layer.

8. A display device comprising:
a tri-phosphor fluorescent light tube including three kinds of phosphors respectively radiating blue, green and red light, said tri-phosphor fluorescent light tube having luminous efficiency equivalent to 90% or lower of luminous efficiency of a tri-phosphor fluorescent light tube including $BaMg_2Al_{16}O_{27}:Eu$, $LaPO_4:Ce,Tb$ and $Y_2O_3:Eu$ as phosphors thereof,
optical elements for controlling transmission of light from said tri-phosphor fluorescent light tube, and
a substrate including color filter layers of red, green and blue;
wherein a radiant energy of said tri-phosphor fluorescent light tube is equivalent to 50% or lower of a maximum peak of a radiant energy of said blue phosphor at a wavelength where spectral transmittance curves of said blue and said green color filter layers intersect, and
said tri-phosphor fluorescent light tube and said color filter layers have a relation such that a color reproduction region of light emitted from said tri-phosphor fluorescent light tube through said color filter layers has an NTSC ratio of 85% or higher.

9. The display device according to claim 8, wherein said fluorescent light tube includes any one of $Zn_2SiO_4:Mn$ and $3(Ba,Mg,Eu,Mn)0.8Al_2O_3$ as a green phosphor.

10. The display device according to claim 9, wherein said color reproduction region of the light emitted via said color filter layers has an NTSC ratio of 100% or higher.

11. The display device according to claim 9, wherein a wavelength of said maximum peak of the radiant energy spectrum of said green phosphor is included within a wavelength region having transmittance of 90% or higher of maximum transmittance of said green color filter layer.

12. The display device according to claim 9,
wherein maximum transmittance of light of said green color filter layer is 55% or higher, and
maximum transmittance of light of said blue color filter layer is 40% or higher.

13. The display device according to claim 9,
wherein said display device includes a liquid crystal display panel having:
a first transparent substrate,
a second transparent substrate, and
a liquid crystal material as said optical elements, said liquid crystal material being filled between said first transparent substrate and said second transparent substrate; and said liquid crystal display panel includes:

said color filter layers, and a plurality of pixel electrodes for applying electric fields to said liquid crystal material, said plurality of pixel electrodes being transparent electrodes that are arranged in a matrix layout with said color filter layers.

* * * * *